US010023232B2

(12) United States Patent
Kita et al.

(10) Patent No.: US 10,023,232 B2
(45) Date of Patent: Jul. 17, 2018

(54) VEHICLE BODY FRONT STRUCTURE (71) Applicant: HONDA MOTOR CO., LTD., Tokyo (JP)

(72) Inventors: Ryo Kita, Wako (JP); Kanji Kaneko, Wako (JP); Hirotaka Yamaguchi, Wako (JP); Hiroyuki Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 55 days.

(21) Appl. No.: 15/340,295

(22) Filed: Nov. 1, 2016

(65) Prior Publication Data
US 2017/0120952 A1 May 4, 2017

(30) Foreign Application Priority Data

Nov. 2, 2015 (JP) ................. 2015-215955

(51) Int. Cl.
*B62D 21/02* (2006.01)
*B62D 21/15* (2006.01)
(Continued)

(52) U.S. Cl.
CPC .......... *B62D 21/152* (2013.01); *B62D 21/02* (2013.01); *B62D 21/155* (2013.01);
(Continued)

(58) Field of Classification Search
CPC .... B62D 21/02; B62D 21/152; B62D 21/155; B62D 25/082; B62D 25/2018; B62D 27/04
See application file for complete search history.

(56) References Cited

U.S. PATENT DOCUMENTS

2004/0145216 A1* 7/2004 Kuroda ............... B60G 7/02
296/203.02
2005/0077754 A1 4/2005 Tomita
(Continued)

FOREIGN PATENT DOCUMENTS

JP 3-235764 A 10/1991
JP 5-62383 U 8/1993
(Continued)

OTHER PUBLICATIONS

Office Action dated Sep. 1, 2017, issued in counterpart Japanese Application No. 2015-215955, with English translation (7 pages).

*Primary Examiner* — Gregory A Blankenship
(74) *Attorney, Agent, or Firm* — Westerman, Hattori, Daniels & Adrian, LLP (57) ABSTRACT A vehicle body front structure includes: a bracket 21 that is placed on a lower portion of a front side frame 12; and a front subframe 16 that is attached to a lower portion of the bracket with a bolt 22. The bracket includes: a closed-end hollow bracket body 30 that is suspended from the front side frame; a bulkhead 40 that is located above a bottom plate 31 of the bracket body and vertically partitions the bracket body; and a collar 50 that extends from the bulkhead to the bottom plate of the bracket body. A thickness t2 of the bulkhead is smaller than a thickness t1 of the bracket body. The bulkhead joined to the bracket body has a bulkhead-side flange 44 joined to the front side frame.

7 Claims, 7 Drawing Sheets (51) Int. Cl.
   *B62D 25/08*  (2006.01)
   *B62D 25/20*  (2006.01)
   *B62D 27/04*  (2006.01)
   *B62D 27/02*  (2006.01)
   *B62D 21/11*  (2006.01)

(52) U.S. Cl.
   CPC ........... *B62D 25/082* (2013.01); *B62D 27/02* (2013.01); *B62D 27/04* (2013.01); *B62D 21/11* (2013.01); *B62D 25/2018* (2013.01)

(56) References Cited

U.S. PATENT DOCUMENTS

| | | | | |
|---|---|---|---|---|
| 2011/0198889 | A1* | 8/2011 | Takeshita | B62D 21/11 296/203.02 |
| 2013/0200653 | A1* | 8/2013 | Yasui | B62D 21/11 296/187.08 |
| 2015/0021891 | A1* | 1/2015 | Sangha | B62D 27/065 280/784 |
| 2015/0061272 | A1* | 3/2015 | Watanabe | B62D 21/11 280/784 |
| 2017/0120952 | A1* | 5/2017 | Kita | B62D 21/02 |
| 2017/0197662 | A1* | 7/2017 | Nakamoto | B62D 21/155 |
| 2017/0217495 | A9* | 8/2017 | Taguchi | B62D 21/152 |
| 2017/0225718 | A1* | 8/2017 | Narahara | B62D 27/04 |
| 2017/0247057 | A1* | 8/2017 | Tatsuwaki | B62D 21/11 |

FOREIGN PATENT DOCUMENTS

| | | |
|---|---|---|
| JP | 2005-112197 A | 4/2005 |
| JP | 2006-205811 A | 8/2006 |
| JP | 2006-327274 A | 12/2006 |

\* cited by examiner

VEHICLE BODY FRONT STRUCTURE

CROSS-REFERENCE OF RELATED APPLICATION

This application claims priority of Japanese Patent Application No. 2015-215955 filed in Japan on Nov. 2, 2015, the entire contents of which are incorporated herein by reference.

TECHNICAL FIELD

The present invention relates to an improvement in the technique of a vehicle body front structure equipped with a front subframe.

BACKGROUND OF THE INVENTION

Some kinds of vehicles, such as passenger vehicles, are equipped with a front subframe in a front portion of a vehicle body. In vehicles of these kinds, left and right brackets are placed on lower portions of left and right front side frames that are located in the front portion of the vehicle body and extend in a longitudinal direction with respect to the vehicle body, and the front subframe is attached to lower portions of the left and right brackets with left and right bolts. The vehicle body front structure with such a structure is known in Japanese Patent Application Publication No. Hei 2006-205811, for example.

In the vehicle body front structure known in Japanese Patent Application Publication No. Hei 2006-205811, the left and right brackets are suspended from lower faces of front portions of the left and right front side frames. Front end portions of the front subframe are attached to the left and right brackets with the left and right bolts. The left and right brackets are configured to be welded to the lower faces of the front portions of the left and right front side frames.

Recently, the technique on how to absorb collision energy when a collision occurs at a front portion of a vehicle body has been under development. In order for the vehicle body to absorb the collision energy more effectively, it is preferable that a front subframe be detached from left and right front side frames by a collision load. On the other hand, during normal travel of a vehicle, it is requested that the driving performance and ride comfort of the vehicle be maintained by fastening the front subframe to the left and right front side frames properly, which is contradictory to the above request.

SUMMARY OF INVENTION

The present invention aims to provide a technique which enables the driving performance and ride comfort of a vehicle to be maintained during normal travel of the vehicle and enables a vehicle body to absorb collision energy more effectively when a collision occurs at a front portion of the vehicle body.

According to the present invention, in a vehicle body front structure, left and right brackets are placed on lower portions of left and right front side frames that are located in a front portion of a vehicle body and extend in a longitudinal (front-to-rear) direction with respect to the vehicle body, and a front subframe is attached to lower portions of the left and right brackets with left and right bolts.

The left and right brackets include: left and right closed-end hollow bracket bodies that are suspended from lower faces of the left and right front side frames; left and right bulkheads that are located above bottom plates of the left and right bracket bodies and vertically partition the inside of the left and right bracket bodies; and left and right hollow collars that extend from the left and right bulkheads to, or to the vicinity of, the bottom plates of the left and right bracket bodies.

The thickness of each of the left and right bulkheads is set smaller than the thickness of each of the left and right bracket bodies. The left and right bulkheads are configured to be joined to the left and right bracket bodies, and each have at least one bulkhead-side flange that is configured to be welded to a corresponding one of the left and right front side frames. Upper end portions of the left and right collars are configured to be supported by the left and right bulkheads. Upper end portions of the left and right bolts that are inserted in the left and right collars are attached to the upper end portions of the left and right collars.

In this way, the thickness of each of the left and right bulkheads is smaller than the thickness of each of the left and right bracket bodies. Thus, the thickness of at least one bulkhead-side flange provided to each of the left and right bulkheads is also small. The left and right bulkhead-side flanges are configured to be welded to the left and right front side frames.

In general, the smaller the thickness of each bulkhead-side flange is, the smaller is the strength of the portions where the bulkhead-side flanges are welded to the left and right front side frames. Accordingly, by the collision load generated when a collision occurs at the front portion of the vehicle body, the welded portions of the bulkhead-side flanges of the left and right brackets can be ruptured first. These ruptured parts of the welded portions act as starting points of rupture of the portions where the left and right brackets are joined to the left and right front side frames. Since the front subframe is detached from the left and right front side frames by the collision load, the vehicle body can absorb collision energy more effectively.

Meanwhile, during normal travel of the vehicle, no excessive load such as the collision load acts on the portions where the bulkhead-side flanges are welded to the left and right front side frames. Thus, the portions where the bulkhead-side flanges are welded to the left and right front side frames have sufficient strength. Accordingly, the front subframe is fastened to the left and right front side frames properly. Thereby, the driving performance and ride comfort of the vehicle can be maintained.

Preferably, the lower faces of the left and right front side frames and the left and right bracket bodies are combined to form a closed section. Thereby, the rigidity of the left and right brackets can be enhanced, and thus the driving performance and ride comfort of the vehicle can be improved.

More preferably, the left and right bulkhead-side flanges extend toward the front of the vehicle body from the left and right bulkheads along the lower faces of the left and right front side frames. In other words, the left and right bulkhead-side flanges extend in a direction where the collision load acts from the front of the vehicle body via the left and right front side frames (i.e., forward). This enables the welded portions of the bulkhead-side flanges of the left and right brackets to be ruptured first by the collision load more reliably, and thus enables the front subframe to be detached from the left and right front side frames by the collision load more easily.

More preferably, the left and right bulkhead-side flanges have left and right convex portions bulging downward. These convex portions can enhance the rigidity of the left and right bulkhead-side flanges despite their small thickness. Accordingly, the driving performance and ride comfort of the vehicle can be improved.

More preferably, the left and right bracket bodies have left and right body-side flanges that are configured to be welded to the left and right front side frames. The left and right body-side flanges have left and right convex portions bulging downward. These convex portions can enhance the rigidity of the left and right body-side flanges. Thus, it is not necessary to increase the thickness of the left and right body-side flanges in order to improve the driving performance and ride comfort of the vehicle.

More preferably, the bottom plates of the left and right bracket bodies have left and right water drain holes. Thereby, rainwater having entered into the left and right brackets can be drained through the left and right water drain holes easily.

More preferably, the left and right bracket bodies respectively have: left and right inner side plates each in the form of a vertical plate located on the inner side in a vehicle widthwise direction; and left and right outer side plates each in the form of a vertical plate located on the outer side in the vehicle widthwise direction. Faces of each of the left and right inner side plates and a corresponding one of the left and right outer side plates are opposed to each other. One of sets of the left and right inner side plates and the left and right outer side plates has left and right openings that penetrate toward upper end portions of faces of the other set.

In this way, one of the sets of the inner side plates and the outer side plates of the bracket bodies has the left and right openings that penetrate toward the upper end portions of the faces of the other set. Each of the left and right openings can serve as an opening for electrode insertion through which one electrode of a spot welder can be inserted.

For example, each inner side plate can be joined to a vehicle-widthwise inner side face of the front side frame by spot welding. On the other hand, each outer side plate can be joined to a vehicle-widthwise outer side face of the front side frame by spot welding. In this welding process, one electrode of the spot welder can be inserted into the bracket body from the outside through the opening. This enables one electrode, inserted through the opening, and the other electrode of the spot welder to spot weld the side plate of the bracket body and the side plate of the front side frame together while pinching these therebetween. Accordingly, spot welding can be applied easily with a simple configuration achieved by merely providing the opening in the side plate of the bracket body.

The present invention enables the driving performance and ride comfort of a vehicle to be maintained during normal travel and enables a vehicle body to absorb collision energy more effectively when a collision occurs at a front portion of the vehicle body.

DETAILED DESCRIPTION OF THE INVENTION

Embodiments of the present invention are described below based on the accompanying drawings.

Embodiment

A vehicle body front structure according to the embodiment is described based on the drawings. Note that the terms "front", "rear", "left", "right", "up", and "down" of a vehicle body are defined based on directions viewed from a driver, and Fr indicates a front side, Rr indicates a rear side and Le indicates a left side.

Figure 1:
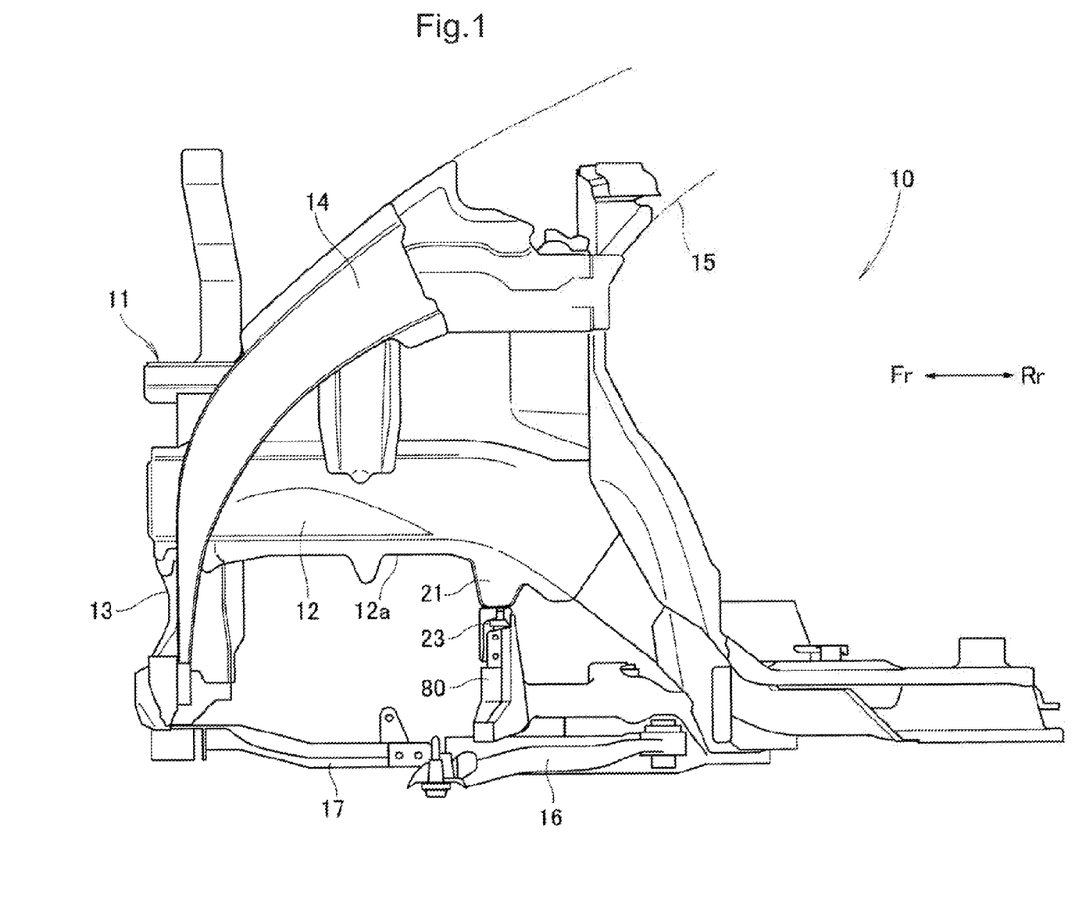
FIG. 1 is a left side view of a front portion of a vehicle body according to the present invention.

As illustrated in FIG. 1, a vehicle 10 such as a passenger vehicle has a vehicle body 11 which is a monocoque body. The vehicle body 11 is formed to be substantially symmetrical about a vehicle-widthwise center line CL that passes through the vehicle-widthwise center of the vehicle 10 and extends in the longitudinal direction with respect to the vehicle. In this embodiment, only the left half of a front portion of the vehicle body 11 is illustrated. The right half of the front portion of the vehicle body 11 has the same configuration as the left half except that it is symmetrical to the left half, and thus the right half is not illustrated and not described in detail either.

The front portion of the vehicle body 11 includes: left and right front side frames 12; a front bulkhead 13; and left and right front upper members 14. The left and right front side frames 12 are located at both sides of the front portion of the vehicle body in the vehicle widthwise direction, and extend in the longitudinal direction with respect to the vehicle body. The front bulkhead 13 is placed between front end portions of the left and right front side frames 12. The left and right front upper members 14 are located outside the left and right front side frames 12 in the vehicle widthwise direction, and extend from left and right front pillars 15 while curving downward toward the front. Front lower end portions of the left and right front upper members 14 are joined to both sides of the left and right front side frames 12, respectively.

A subframe 16 is attached to the left and right front side frames 12 from below. More specifically, front portions of the subframe 16 are respectively attached to central portions of the left and right front side frames 12 in the longitudinal direction. Rear portions of the subframe 16 are respectively attached to rear end portions of the left and right front side frames 12. Front end portions of the subframe 16 and lower end portions of the front bulkhead 13 are connected to each other via left and right under load paths 17, respectively. A power unit, left and right front wheel suspensions, and a gear box for a steering unit (which are not illustrated) are mounted on the subframe 16.

Figure 2:
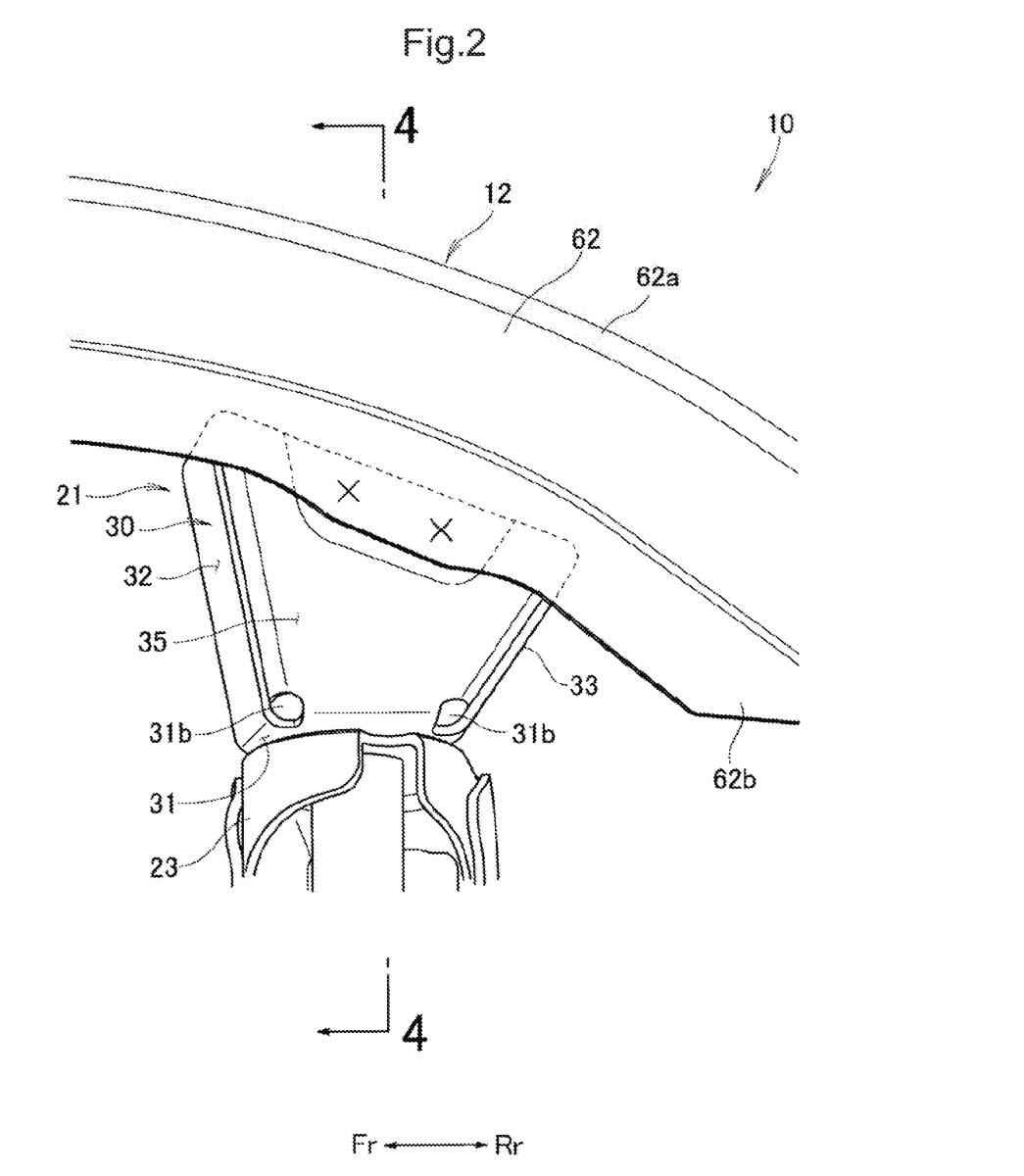
FIG. 2 is an enlarged view of a bracket illustrated in FIG. 1.

Hereinbelow, a detailed description is given of a front-portion attachment structure for attaching the left and right front portions of the subframe 16 to the left and right front side frames 12. As illustrated in FIGS. 1 and 2, the left and right front side frames 12 are respectively provided with left and right brackets 21 at their lower portions.

Figure 3:
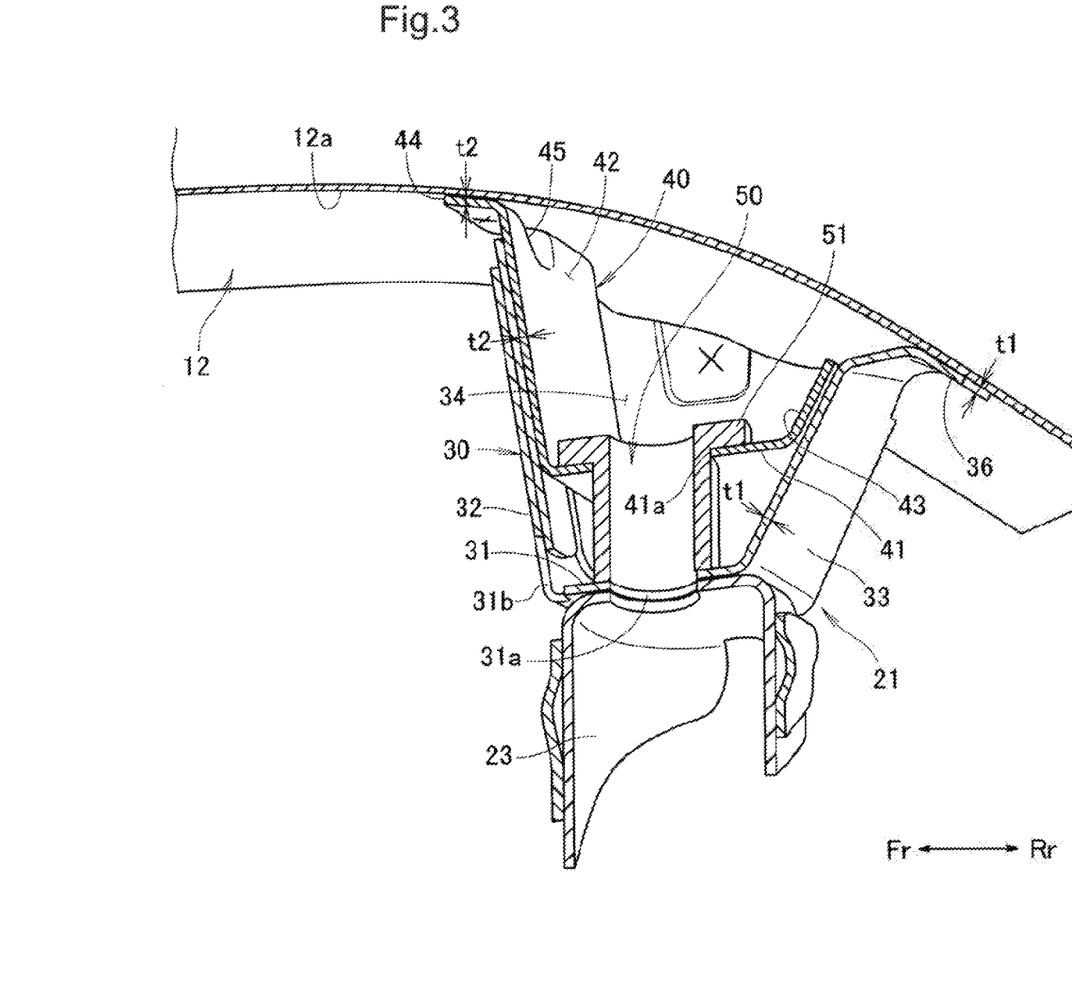
FIG. 3 is a sectional view of the bracket illustrated in FIG. 2 from which a bolt is removed.
Figure 4:
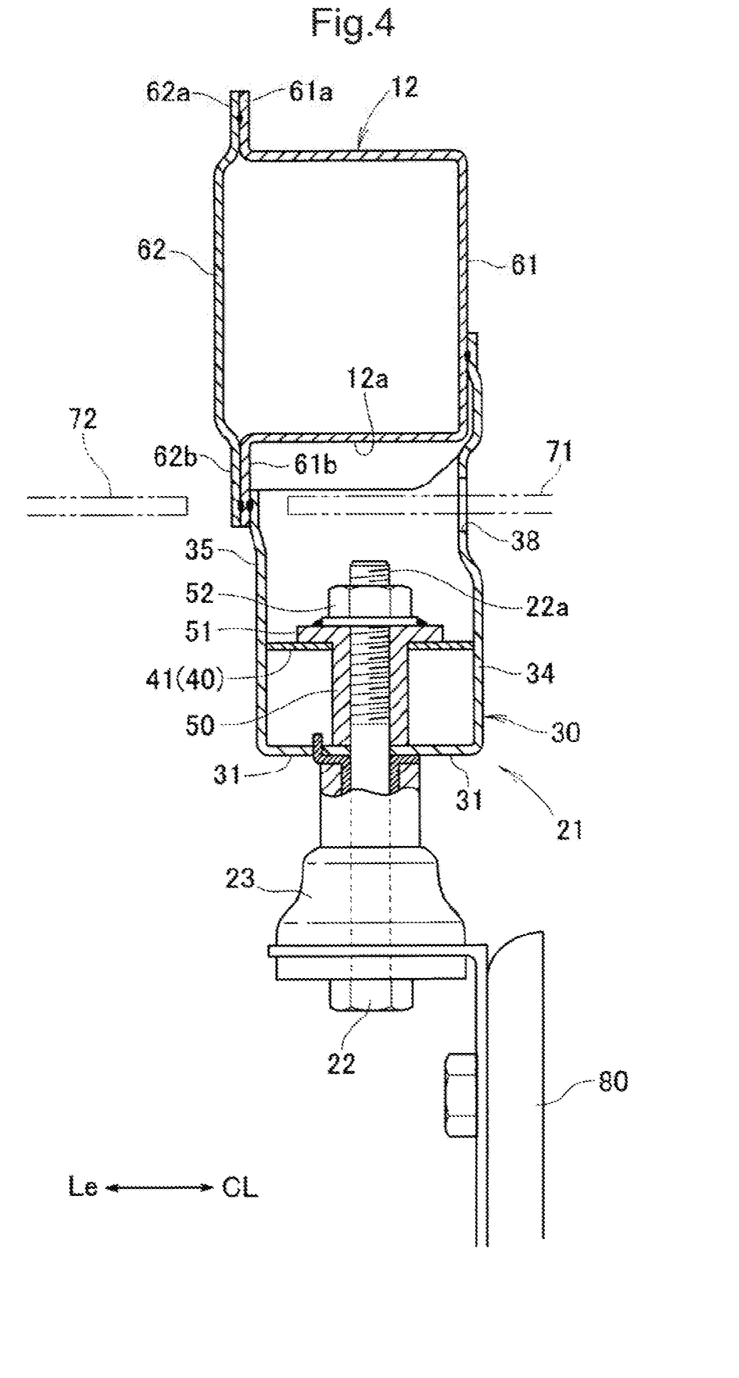
FIG. 4 is a sectional view taken along the line 4-4 in FIG. 2.

As illustrated in FIGS. 2 to 4, the front end portions of the front subframe 16 are attached to lower portions of the left and right brackets 21 with left and right bolts 22 (see FIG. 4), respectively. For example, the front subframe 16 is attached to the left and right brackets 21 in such a way that it is hung from the lower portions of the left and right brackets 21 with elastic members 23 such as rubber interposed therebetween, i.e., by means of a so-called floating attachment structure. In this respect, the attachment structure is not limited to the floating attachment structure, and a rigid attachment structure may be employed instead.

The left and right brackets 21 include: left and right bracket bodies 30; left and right bulkheads 40; and left and right collars 50.

First, the left and right bracket bodies 30 are described. As illustrated in FIGS. 3 to 6, the left and right bracket bodies 30 are closed-end hollow (cup-shaped) members suspended from lower faces 12a of the left and right front side frames 12. In other words, the left and right bracket bodies 30 are parts formed by subjecting a metal plate such as a steel plate to bending, and are each shaped in the form of a substantially rectangular box in a plan view that is open at its upper end. The upper ends of the left and right bracket bodies 30 have contours formed to extend along the lower faces 12a of the left and right front side frames 12.

The upper ends of the left and right brackets 21 are respectively joined to the lower faces 12a of the left and right front side frames 12. Accordingly, the lower faces 12a of the left and right front side frames 12 and the left and right bracket bodies 30 are combined to form a closed section. Thereby, it is possible to enhance the rigidity of the left and right brackets 21, and thus improve the driving performance and ride comfort of the vehicle 10.

To put it more specifically, as viewed from the side of the vehicle body, the left and right bracket bodies 30 each have a tapered shape that is tapered from its upper end toward the bottom. The left and right bracket bodies 30 are each composed of: a bottom plate 31 in the form of a substantially horizontal lateral plate; a front plate 32 in the form of a vertical plate standing from the front edge of the bottom plate 31; a rear plate 33 in the form of a vertical plate standing from the rear edge of the bottom plate 31; an inner side plate 34 in the form of a vertical plate standing from the vehicle-widthwise inner edge of the bottom plate 31; and an outer side plate 35 in the form of a vertical plate standing on the vehicle-widthwise outer edge of the bottom plate 31.

A bolt hole 31a is formed at the center of the bottom plate 31 so as to penetrate the bottom plate vertically. The front plate 32 extends from the bottom plate 31 to the vicinity of the lower face 12a of the front side frame 12. The rear plate 33 extends from the bottom plate 31 to the lower face 12a of the front side frame 12.

Figure 6:
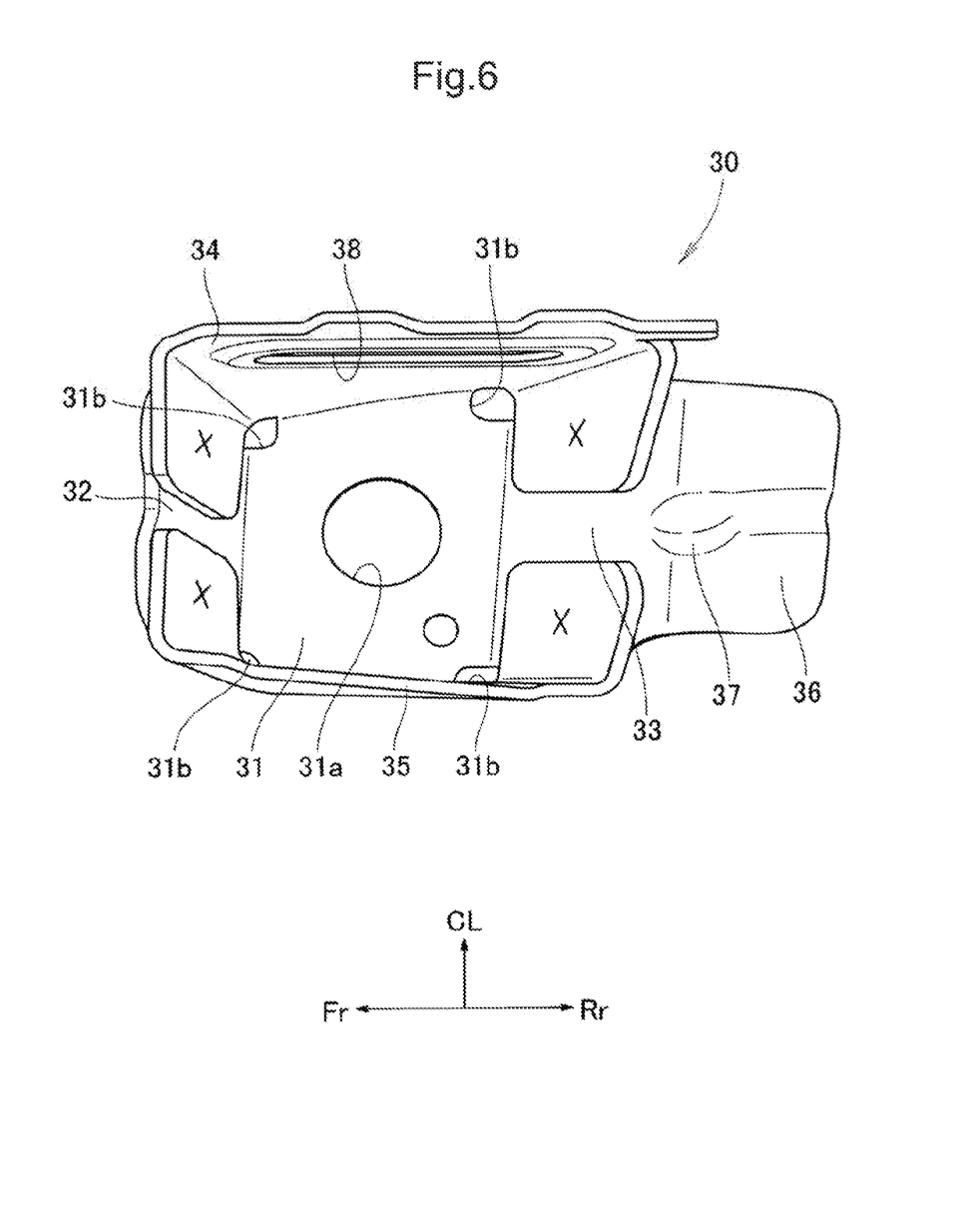
FIG. 6 is a perspective view of a bracket body illustrated in FIG. 5.

In addition, the bottom plate 31 of each of the left and right bracket bodies 30 has left and right water drain holes 31b. The water drain holes 31b are through holes formed at the four corners of the bottom plate 31 having a substantially rectangular shape in the plan view. Rainwater having entered into the left and right brackets 21 can be drained through the left and right water drain holes 31b easily.

The upper end of the rear plate 33 has at least one body-side flange 36 formed integrally therewith. The body-side flange 36 is a lateral plate extending toward the rear of the vehicle body from the upper end of the rear plate 33, and is configured to be joined to the lower face 12a of the front side frame 12 by spot welding, fillet welding, or the like. In this way, the left and right bracket bodies 30 have the left and right body-side flanges 36 configured to be welded to the left and right front side frames 12.

The left and right body-side flanges 36 each have at least one convex portion 37 (left and right body-side convex portions 37) bulging downward. The body-side convex portions 37 have a downward-protruding configuration by recessing the upper faces of the left and right body-side flanges 36. The body-side convex portions 37 are preferably located at corners formed by the upper ends of the left and right rear plates 33 and the left and right body-side flanges 36. The body-side convex portions 37 can enhance the rigidity of the left and right body-side flanges 36. Thus, it is not necessary to increase the thickness of the left and right body-side flanges 36 in order to improve the driving performance and ride comfort of the vehicle 10 (see FIG. 1).

As described above, the left and right bracket bodies 30 respectively have: the left and right inner side plates 34 each in the form of a vertical plate located on the inner side in the vehicle widthwise direction; and the left and right outer side plates 35 each in the form of a vertical plate located on the outer side in the vehicle widthwise direction. The faces of each of the left and right inner side plates 34 and a corresponding one of the left and right outer side plates 35 are opposed to each other. One of the sets of the left and right inner side plates 34 and the left and right outer side plates 35 has left and right openings 38 that penetrate toward upper end portions of the faces of the other set. For example, the left and right openings 38 are formed in the left and right inner side plates 34.

Figure 7:
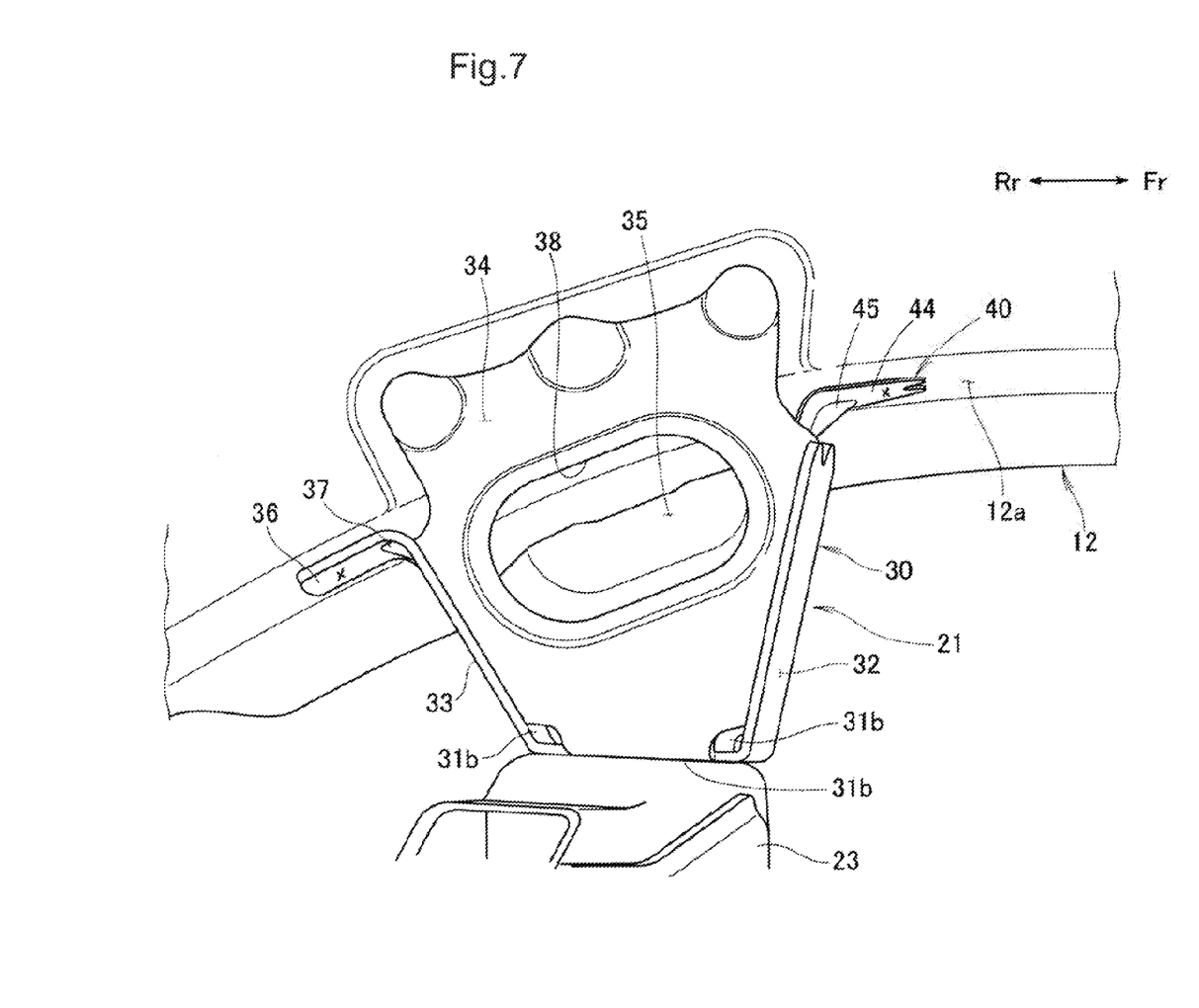
FIG. 7 is a side view of the bracket illustrated in FIG. 2 as viewed from the vehicle-widthwise center side.

FIGS. 2, 4, and 7 illustrate a configuration where the left bracket body 30 is joined to the left front side frame 12. The left front side frame 12 is configured to have a substantially rectangular closed section by: a side inner panel 61 located on the inner side in the vehicle widthwise direction; and a side outer panel 62 located on the outer side in the vehicle widthwise direction.

The side inner panel 61 has an upper flange 61a and a lower flange 61b. The side outer panel 62 also has an upper flange 62a and a lower flange 62b. The upper flanges 61a, 62a are located on the outer side or the inner side in the vehicle widthwise direction, and are configured to be joined to each other by spot welding. The lower flanges 61b, 62b are located on the outer side in the vehicle widthwise direction, and are configured to be joined to each other by spot welding.

The inner side plate 34 of the left bracket body 30 is configured to be laid over the vehicle-widthwise inner side face of the left front side frame 12, i.e., the vehicle-widthwise inner side face of the side inner panel 61 from the inside in the vehicle widthwise direction, and joined thereto by spot welding.

On the other hand, the outer side plate 35 of the left bracket body 30 is configured to be laid over the vehicle-widthwise outer side face of the left front side frame 12, i.e., the vehicle-widthwise inner face of the lower flange 62b of the side outer panel 62 from the inside in the vehicle widthwise direction, and joined thereto by spot welding.

The inner side plate 34 has the opening 38 that penetrates toward the upper end portion of the face of the outer side panel 35. The opening 38 can serve as an opening for electrode insertion through which one electrode 71 of a spot welder (not illustrated) can be inserted. Specifically, in a welding process, one electrode 71 of the spot welder can be inserted into the bracket body 30 from the vehicle-widthwise central side through the opening 38. This enables one electrode 71, inserted through the opening 38, and the other electrode 72 of the spot welder to spot weld the outer side plate 35 of the bracket body 30 and the lower flanges 61b, 62b of the front side frame 12 together while pinching these therebetween. With a simple configuration achieved by merely providing the opening 38 in the side plate 34 (inner side plate 34) of the bracket body 30, it is possible to spot weld the left bracket body 30 to the left front side frame 12 easily.

Figure 5A:
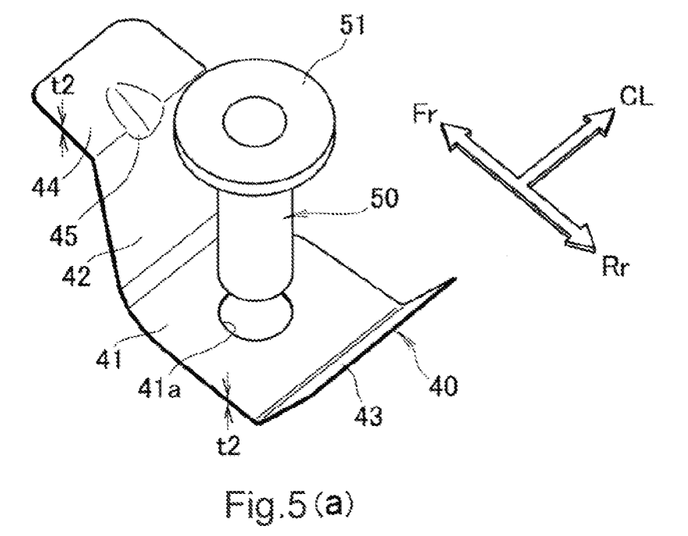
FIGS. 5(a) and 5(b) are perspective views illustrating the configuration of only a single bulkhead illustrated in FIG. 3 and the configuration of the entire bracket.
Figure 5B:
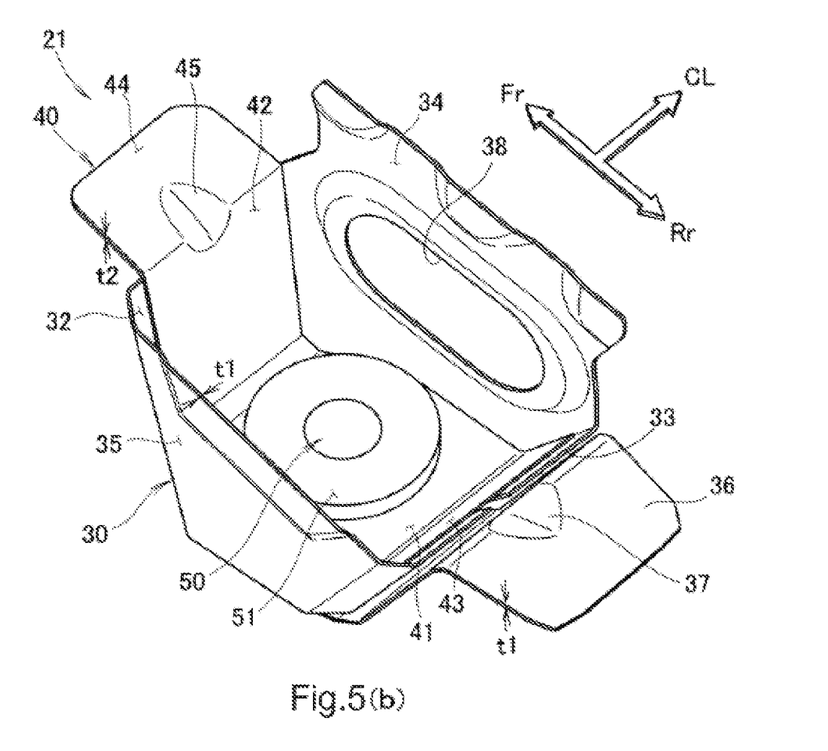

Next, the left and right bulkheads 40 are described. As illustrated in FIGS. 3 to 5, the left and right bulkheads 40 are members that are located above the bottom plates 31 of the left and right bracket bodies 30, and partition the inside of the left and right bracket bodies 30 by extending in the horizontal direction, thereby dividing the inside spaces of said left and right bracket bodies into upper and lower spaces in the vertical direction.

FIG. 5(a) illustrates the left and right bulkheads 40 and the left and right collars 50 separately. FIG. 5(b) illustrates a configuration achieved by combining the left and right bulkheads 40 and the left and right collars 50 with the left and right bracket bodies 30.

The left and right bulkheads 40 are configured to be joined to the left and right bracket bodies 30. More specifically, the left and right bulkheads 40 are parts formed by subjecting a metal plate such as a steel plate to bending, and are each shaped to have a substantially U-shaped form as seen in the vehicle widthwise direction. The left and right bulkheads 40 are preferably made of the same material as the left and right bracket bodies 30.

The left and right bulkheads 40 are each composed of: a bottom plate 41 in the form of a substantially horizontal lateral plate; a front plate 42 in the form of a vertical plate standing from the front edge of the bottom plate 41; and a rear plate 43 in the form of a vertical plate standing from the rear edge of the bottom plate 41. The bottom plates 41 of the left and right bulkheads 40 are located above the bottom plates 31 of the left and right bracket bodies 30 with a preset certain clearance therebetween. A through hole 41a that penetrates vertically is formed at the center of the bottom plate 41 of each of the left and right bulkheads 40.

The front plates 42 of the left and right bulkheads 40 extend from the bottom plates 41 to the lower faces 12a of the left and right front side frames 12 along the inner faces of the front plates 32 of the left and right bracket bodies 30. The rear plates 43 of the left and right bulkheads 40 extend from the bottom plates 41 to the vicinity of the upper ends of the rear plates 33 of the left and right bracket bodies 30 along the inner faces of the rear plates 33.

At least one bulkhead-side flange 44 is formed integrally on the upper end of the front plate 42 of each of the left and right bulkheads 40. The bulkhead-side flange 44 is a lateral plate extending toward the front of the vehicle body from the upper end of the front plate 42, and is configured to be joined to the lower face 12a of the front side frame 12 by spot welding, fillet welding, or the like. In this way, the left and right bulkheads 40 each have at least one bulkhead-side flange 44 configured to be welded to a corresponding one of the left and right front side frames 12.

As illustrated in FIGS. 3 and 5, since the left and right bracket bodies 30 are parts formed by bending, a thickness t1 of the body-side flange 36 is the same as a thickness t1 of each of the left and right bracket bodies 30. On the other hand, since the left and right bulkheads 40 are parts formed by bending, a thickness t2 of the bulkhead-side flange 44 is the same as a thickness t2 of each of the left and right bulkheads 40. The thickness t2 of each of the left and right bulkheads 40 is set smaller than the thickness t1 of each of the left and right bracket bodies 30. Hence, the thickness t2 of the bulkhead-side flange 44 provided to each of the left and right bulkheads 40 is smaller than the thickness t1 of the body-side flange 36 provided to each of the left and right bracket bodies 30. The left and right bulkhead-side flanges 44 are configured to be welded to the left and right front side frames 12.

In general, the smaller the thickness t2 of each bulkhead-side flange 44 is, the smaller is the strength of the portions where the bulkhead-side flanges 44 are welded to the left and right front side frames 12. Accordingly, by the collision load generated when a collision occurs at the front portion of the vehicle body 11, the welded portions of the bulkhead-side flanges 44 of the left and right brackets 21 can be ruptured first. These ruptured parts of the welded portions act as starting points of rupture of the portions where the left and right brackets 21 are joined to the left and right front side frames 12. Since the front subframe 16 is detached from the left and right front side frames 12 by the collision load, the vehicle body can absorb collision energy more effectively.

Meanwhile, during normal travel of the vehicle 10 (see FIG. 1), no excessive load such as the collision load acts on the portions where the bulkhead-side flanges 44 are welded to the left and right front side frames 12. Thus, the portions where the bulkhead-side flanges 44 are welded to the left and right front side frames 12 have sufficient strength. Accordingly, the front subframe 16 is fastened to the left and right front side frames 12 properly. Thereby, the driving performance and ride comfort of the vehicle 10 can be maintained.

As is clear from the above description, the left and right bulkhead-side flanges 44 extend toward the front of the vehicle body from the left and right bulkheads 40 along the lower faces 12a of the left and right front side frames 12. In other words, the left and right bulkhead-side flanges 44 extend in a direction where the collision load acts from the front of the vehicle body via the left and right front side frames 12 (i.e., forward). This enables the welded portions of the bulkhead-side flanges 44 of the left and right brackets 21 to be ruptured first by the collision load more reliably, and thus enables the front subframe 16 to be detached from the left and right front side frames 12 by the collision load more easily.

The left and right bulkhead-side flanges 44 each have at least one convex portion 45 (left and right head-side convex portions 45) bulging downward. The head-side convex portions 45 have a downward-protruding configuration by recessing the upper faces of the left and right bulkhead-side flanges 44. The head-side convex portions 45 are preferably located at corners formed by the upper ends of the left and right front plates 42 and the left and right bulkhead-side flanges 44. The head-side convex portions 45 can enhance the rigidity of the left and right bulkhead-side flanges 44 despite their small thickness. Accordingly, the driving performance and ride comfort of the vehicle 10 (see FIG. 1) can be improved.

Next, the left and right collars 50 are described. As illustrated in FIGS. 3 to 5, the left and right collars 50 are hollow members that extend from the left and right bulkheads 40 to, or to the vicinity of, the bottom plates 31 of the left and right bracket bodies 30 and that have through holes in its axial direction through which the bolts 22 are to penetrate. Left and right flanges 51 are formed integrally on the upper ends of the left and right collars 50. Upper end portions of the left and right collars 50, i.e., the left and right flanges 51 are configured to be supported by the left and right bulkheads 40. Left and right nuts 52 (see FIG. 4) are joined to the upper faces of the left and right flanges 51.

To the upper end portions of the left and right collars 50, i.e., the left and right nuts 52, upper end portions 22a (screw portions 22a) of the left and right bolts 22 that are inserted in the left and right collars 50 are attached. More specifically, as illustrated in FIGS. 1 and 4, left and right hangers 80 extending upward are placed on the front end portions of the front subframe 16. Upper end portions of the left and right hangers 80 are laid on the bottom faces of the bracket bodies 30 directly or with the elastic members 23 interposed therebetween, and the left and right bolts 22 are inserted in the left and right collars 50 from below. The screw portions 22a of the left and right bolts 22 are screwed in the left and right nuts 52. Thereby, the front end portions of the front subframe 16 are hung on the lower portions of the left and right brackets 21.

INDUSTRIAL APPLICABILITY

The vehicle body front structure according to the present invention is suitable for being used in the configuration of the vehicle body 11 of the vehicle 10, such as a passenger vehicle, having the subframe 16 on which the power unit is mounted.

DESCRIPTION OF REFERENCE NUMERALS

10 VEHICLE
11 VEHICLE BODY
12 FRONT SIDE FRAME
12a LOWER FACE
21 BRACKET
22 BOLT
30 BRACKET BODY
31 BOTTOM PLATE
31b WATER DRAIN HOLE
34 INNER SIDE PLATE
35 OUTER SIDE PLATE
36 BODY-SIDE FLANGE
37 CONVEX PORTION (BODY-SIDE CONVEX PORTION)
38 OPENING
40 BULKHEAD
44 BULKHEAD-SIDE FLANGE
45 CONVEX PORTION (HEAD-SIDE CONVEX PORTION)
50 COLLAR
51 FLANGE (UPPER END PORTION)
t1 THICKNESS OF BRACKET BODY (THICKNESS OF BODY-SIDE FLANGE)
t2 THICKNESS OF BULKHEAD (THICKNESS OF BULKHEAD-SIDE FLANGE)

The invention claimed is:

1. A vehicle body front structure comprising:
left and right front side frames that are located in a front portion of a vehicle body and extend in a longitudinal direction with respect to said vehicle body;
left and right brackets that are placed on lower portions of said left and right front side frames; and
a front subframe that is attached to lower portions of said left and right brackets with left and right bolts, wherein said left and right brackets comprise:
left and right bracket bodies that are suspended from lower faces of said left and right front side frames and that have inside spaces and bottom plates;
left and right bulkheads that are joined to said left and right bracket bodies such that the left and right bulkheads are located above said bottom plates of said left and right bracket bodies and divide the inside spaces of said left and right bracket bodies into upper and lower spaces; and
left and right collars that are provided to said lower spaces and extend from said left and right bulkheads to, or to the vicinity of, said bottom plates of said left and right bracket bodies, the said left and right collars having holes into which said left and right bolts are inserted, upper portions of said left and right bolts being supported by upper portions of said left and right collars, said upper portions of said left and right collars being supported by said left and right bulkheads;
a thickness of each of said left and right bulkheads is set smaller than a thickness of each of said left and right bracket bodies; and
said left and right bulkheads each have at least one bulkhead-side flange that is welded to a corresponding one of said left and right front side frames, at which said left and right bracket bodies are suspended from said lower faces of said left and right front side frames via said at least one bulkhead-side flange.

2. The vehicle body front structure according to claim 1, wherein said lower faces of said left and right front side frames and said left and right bracket bodies are combined to form a closed section.

3. The vehicle body front structure according to claim 1, wherein said left and right bulkhead-side flanges extend toward the front of said vehicle body from said left and right bulkheads along said lower faces of said left and right front side frames.

4. The vehicle body front structure according to claim 1, wherein said left and right bulkhead-side flanges have left and right convex portions bulging downward.

5. The vehicle body front structure according to claim 1, wherein
said left and right bracket bodies have left and right body-side flanges that are welded to said left and right front side frames, and
said left and right body-side flanges have left and right convex portions bulging downward.

6. The vehicle body front structure according to claim 1, wherein said bottom plates of said left and right bracket bodies have left and right water drain holes.

7. The vehicle body front structure according to claim 1, wherein
said left and right bracket bodies respectively have:
left and right inner side plates each in the form of a vertical plate located on an inner side in a vehicle widthwise direction; and
left and right outer side plates each in the form of a vertical plate located on an outer side in the vehicle widthwise direction,
faces of each of said left and right inner side plates and a corresponding one of said left and right outer side plates are opposed to each other, and
one of sets of said left and right inner side plates and said left and right outer side plates has left and right openings that penetrate toward upper end portions of faces of the other set.

* * * * *